US012781806B2

(12) United States Patent
Ichikawa et al.

(10) Patent No.: US 12,781,806 B2
(45) Date of Patent: Nov. 3, 2026

(54) PROPELLER SHAFT

(71) Applicant: HITACHI ASTEMO, LTD., Hitachinaka (JP)

(72) Inventors: Shoichi Ichikawa, Hitachinaka (JP); Daiki Tsutsumi, Hitachinaka (JP); Toshiyuki Masuda, Hitachinaka (JP); Kenichiro Ishikura, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 192 days.

(21) Appl. No.: 18/723,767

(22) PCT Filed: Dec. 14, 2022

(86) PCT No.: PCT/JP2022/046053
§ 371 (c)(1),
(2) Date: Jun. 24, 2024

(87) PCT Pub. No.: WO2023/162418
PCT Pub. Date: Aug. 31, 2023

(65) Prior Publication Data

US 2025/0052284 A1 Feb. 13, 2025

(30) Foreign Application Priority Data

Feb. 24, 2022 (JP) ................................ 2022-026367

(51) Int. Cl.
*F16D 3/38* (2006.01)
*B60K 17/22* (2006.01)

(52) U.S. Cl.
CPC ................ *F16D 3/38* (2013.01); *B60K 17/22* (2013.01)

(58) Field of Classification Search
CPC .................................... F16D 3/38; F16D 9/08
See application file for complete search history.

(56) References Cited

U.S. PATENT DOCUMENTS 4,392,694 A * 7/1983 Reynolds .............. B60K 17/24 384/536
4,932,280 A * 6/1990 Becker .................... F04D 13/02 74/665 F (Continued)

FOREIGN PATENT DOCUMENTS

JP 2020-173031 A 10/2020

OTHER PUBLICATIONS

International Preliminary Report on Patentability dated Sep. 6, 2024 issued in International Application No. PCT/JP2022/046053, with English translation, 10 pages.

(Continued)

*Primary Examiner* — Kenneth L Thompson
(74) *Attorney, Agent, or Firm* — FOLEY & LARDNER LLP

(57) ABSTRACT

A propeller shaft for transmitting driving force of a vehicle includes a first shaft unit mounted to the vehicle via a vehicle mounting member. The first shaft unit includes a sleeve yoke, a stub shaft, and a tube. The sleeve yoke is connected to an output shaft of a transmission of the vehicle, and receives the driving force via the output shaft. The stub shaft is disposed oppositely to the sleeve yoke in a direction of a rotational axis of the first shaft unit. The tube connects the sleeve yoke and the stub shaft. The stub shaft includes a weakest part structured to be less in torsional strength than a remaining part of the first shaft unit and formed at a position at which the stub shaft overlaps with the vehicle mounting member in the direction of the rotational axis.

10 Claims, 6 Drawing Sheets

(56) References Cited

U.S. PATENT DOCUMENTS

| | | | | | |
|---|---|---|---|---|---|
| 5,186,079 | A * | 2/1993 | Gee | B60K 17/22 403/2 |
| 8,118,683 | B2 * | 2/2012 | Disser | F16D 3/065 464/167 |
| 9,982,707 | B2 * | 5/2018 | Nicholas | F16C 19/26 |
| 11,434,959 | B2 * | 9/2022 | Choi | F16D 9/08 |
| 11,668,352 | B2 * | 6/2023 | Schroeder | F16D 9/08 464/30 |
| 2020/0040946 | A1 | 2/2020 | Akita et al. | |

OTHER PUBLICATIONS

International Search Report dated Jan. 24, 2023 issued in International Application No. PCT/JP2022/046053, with English translation, 5 pages.

* cited by examiner

PROPELLER SHAFT

TECHNICAL FIELD

The present invention relates to a propeller shaft.

BACKGROUND ART

Patent Document 1 cited below discloses a conventional propeller shaft.

As an outline, this propeller shaft includes a first shaft connected to a transmission of a vehicle and a second shaft connected to a differential gear of the vehicle. The first shaft and the second shaft are integrally rotatably connected to each other via a center bearing supported by a body of the vehicle. The first shaft is mainly composed of a sleeve yoke, a tube, and a stub shaft. The sleeve yoke receives driving force from the transmission. The tube receives the driving force from the sleeve yoke. The stub shaft is connected to the tube.

PRIOR ART DOCUMENT(S)

Patent Document(s)

Patent Document 1: JP 2020-173031 A

SUMMARY OF THE INVENTION

Problem(s) to be Solved by the Invention

However, the conventional propeller shaft described above fails to consider a relation between strength of the sleeve yoke and strength of the stub shaft. This may cause the sleeve yoke to be lower in torsional strength than the stub shaft and be a weakest part in the first shaft. If the sleeve yoke is damaged, it may cause a leak of lubricant filled inside a case of the transmission receiving the sleeve yoke. This is a room for improvement.

In view of the foregoing technical problem of the conventional propeller shaft, the present invention intends to provide a propeller shaft structured such that a sleeve yoke is greater in torsional strength than a stub shaft.

Means for Solving the Problem(s)

According to one aspect of the present invention, a stub shaft of a first shaft unit includes a weakest part structured to be less in torsional strength than a remaining part of the first shaft unit and formed at a position at which the stub shaft overlaps with a vehicle mounting member.

Effect(s) of the Invention

The above aspect of the present invention causes a sleeve yoke to be greater in torsional strength than the stub shaft.

MODE(S) FOR CARRYING OUT THE INVENTION

The following details propeller shafts according to embodiments of the present invention, with reference to the drawings. The embodiments below exemplify the propeller shafts structured for automobiles as conventional.

Figure 1:
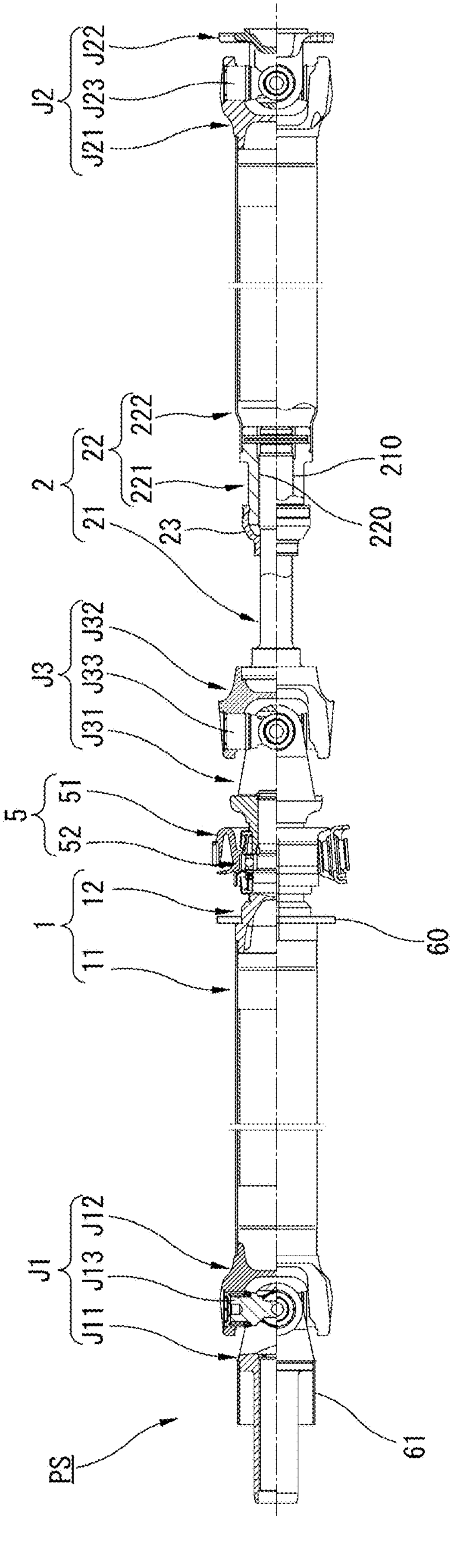
FIG. 1 is a half longitudinal sectional view of a propeller shaft according to a first embodiment of the present invention.

For convenience, the following explanation refers to left and right sides in the drawings as front and rear sides respectively, and refers to a direction of a rotational axis Z of propeller shaft PS shown in FIG. 1 as an axial direction, a direction orthogonal to rotational axis Z as a radial direction, and a direction around rotational axis Z as a circumferential direction, respectively.

(Configurations of Propeller Shaft)

FIG. 1 is a half sectional view of propeller shaft PS according to the first embodiment of the present invention, which shows an entire part of propeller shaft PS.

As shown in FIG. 1, propeller shaft PS is disposed to extend in a front-and-rear direction of a vehicle, between a first rotational shaft not shown disposed in a front part of the vehicle and a second rotational shaft not shown disposed in a rear part of the vehicle. In case that the vehicle has a drive system of FR (front engine rear drive) type, the first rotational shaft in the front part of the vehicle serves as an output shaft of a transmission to receive rotational force from a drive source such as an engine or a motor, while the second rotational shaft in the rear part of the vehicle serves as an input shaft of a differential gear to transmit the rotational force to rear wheels of the vehicle.

Propeller shaft PS of the present embodiment has a two-unit structure including two units split in the front-and-rear direction, i.e., a first shaft 1 and a second shaft 2. First shaft 1 is connected to the transmission not shown via a first joint J1. Second shaft 2 is connected to the differential gear not shown via a second joint J2. First shaft 1 and second shaft 2 are connected to each other via a third joint J3 so as to be rotatable about rotational axis Z integrally with each other.

First shaft 1 includes a front end integrally rotatably connected to the output shaft of the transmission not shown via first joint J1, and includes a rear end mounted to and supported by a bottom of a floor of the vehicle not shown via a vehicle mounting member 5 and connected to second shaft 2 via third joint J3. Vehicle mounting member 5 includes a center bearing supporter 51 and a center bearing 52. Center bearing supporter 51 corresponds to a mounting part according to the present invention. Center bearing 52 corresponds to a supported part according to the present invention, and is suspended from the floor of the vehicle not shown via center bearing supporter 51.

Second shaft 2 includes a front end integrally rotatably connected to first shaft 1 via third joint J3, and includes a rear end integrally rotatably connected to the input shaft of the differential gear not shown via second joint J2. Second shaft 2 includes two pieces split in the axial direction, i.e., a first shaft piece 21 being a front piece and a second shaft piece 22 being a rear piece. First shaft piece 21 and second shaft piece 22 are shaped cylindrical, and are connected to each other so as to be relatively movable in the axial direction with respect to each other via a spline fitting composed of an external spline 210 and an internal spline 220 fitted to each other as described below. Second shaft 2 further includes a cover 23 between first shaft piece 21 and second shaft piece 22. Cover 23 is made of a rubber, and extends to straddle first shaft piece 21 and second shaft piece 22 and cover a connection therebetween, and thereby suppresses a foreign substance from intruding into the spline fitting.

First shaft piece 21 includes a front end fixed to a rear end of a third driven-side joint J32 described below of third joint J3 by press-fitting, and includes a rear end including external spline 210 formed in an outer periphery of the rear end of first shaft piece 21. Second shaft piece 22 includes two parts split in the axial direction, i.e., a second shaft piece connector 221 being a front part and a second shaft piece body 222 being a rear part. Second shaft piece connector 221 is connected to first shaft piece 21. Second shaft piece body 222 is a body of second shaft piece 22.

Second shaft piece connector 221 is made of a predetermined metallic material, and has a shape of a cylinder with a relatively thick wall, and includes internal spline 220 formed in an inner periphery of second shaft piece connector 221. Second shaft piece body 222 is made of a metallic material or a fiber reinforced plastic (FRP), and has a shape of a cylinder with a relatively thin wall. Second shaft piece body 222 includes a front end fixed to a rear end of second shaft piece connector 221 by press-fitting, and includes a rear end fixed to a front end of a second driving-side joint J21 described below of second joint J2 by press-fitting.

First joint J1 includes a first driving-side joint J11, a first driven-side joint J12, and a first cross shaft J13. First driving-side joint J11 is connected to the output shaft of the transmission not shown, and serves as a sleeve yoke according to the present invention. First driven-side joint J12 is connected to first shaft 1. First cross shaft J13 connects first driving-side joint J11 and first driven-side joint J12 integrally rotatably.

Second joint J2 includes the second driving-side joint J21, a second driven-side joint J22, and a second cross shaft J23. Second driving-side joint J21 is connected to second shaft piece 22 of second shaft 2. Second driven-side joint J22 is connected to the input shaft of the differential gear not shown. Second cross shaft J23 connects second driving-side joint J21 and second driven-side joint J22 integrally rotatably.

Third joint J3 includes a third driving-side joint J31, the third driven-side joint J32, and a third cross shaft J33. Third driving-side joint J31 is connected to first shaft 1. Third driven-side joint J32 is connected to first shaft piece 21 of second shaft 2. Third cross shaft J33 connects third driving-side joint J31 and third driven-side joint J32 integrally rotatably.

(Connection Structure Between First Joint and Output Shaft of Transmission)

Figure 2:
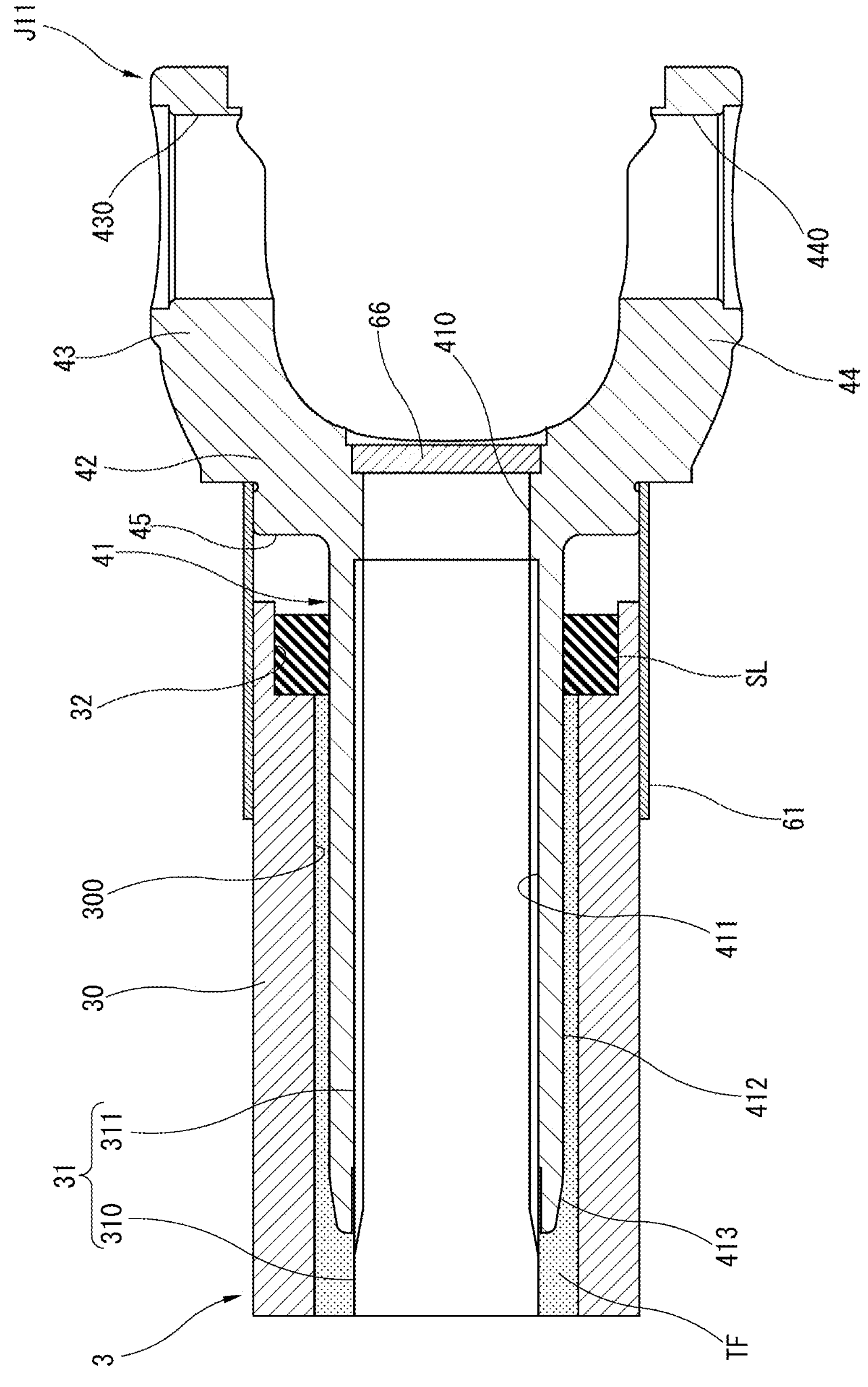
FIG. 2 is an enlarged sectional view of a connection between a sleeve yoke shown in FIG. 1 and a vehicle (in detail, an output shaft of a transmission).
Figure 3:
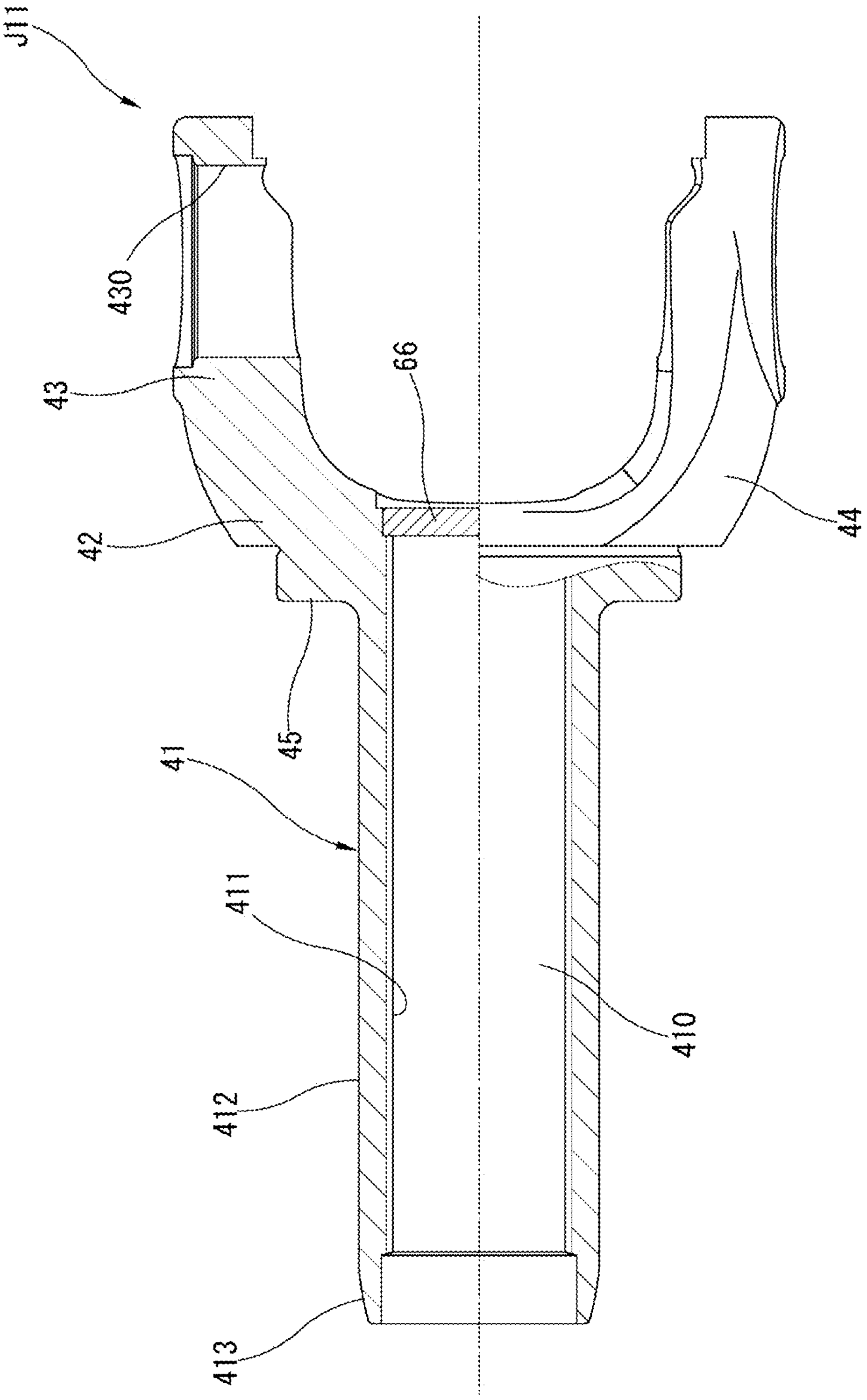
FIG. 3 is a longitudinal sectional view of a first driving-side joint shown in FIG. 2.

FIG. 2 is a partial enlarged sectional view of a connection between first driving-side joint J11 and output shaft 31 of transmission 3 mounted to the vehicle, and shows a longitudinal section of the connection along rotational axis Z of propeller shaft PS. First driving-side joint J11 corresponds to the sleeve yoke according to the present invention. FIG. 3 is a sectional view of first driving-side joint J11 shown in FIG. 2, and shows a longitudinal section of first driving-side joint J11 along rotational axis Z of first driving-side joint J11.

As shown in FIG. 2, transmission 3 includes the output shaft 31 and a case 30. Case 30 is made of a metallic material and shaped substantially cylindrical, and includes a shaft through hole 300 extending through an inside of case 30 in the axial direction. Output shaft 31 is contained in shaft through hole 300, and is connected to a speed change gear not shown. Furthermore, shaft through hole 300 receives a shaft 41 of first driving-side joint J11 inserted in shaft through hole 300 from a rear end of shaft through hole 300. Shaft 41 overlaps with an outer periphery of a rear end of output shaft 31 via a spline coupling described below. Shaft through hole 300 has an inner diameter slightly greater than an outer diameter of shaft 41 of first driving-side joint J11.

The rear end of case 30 includes in its inner periphery a seal retainer 32 retaining a seal SL. Seal SL is shaped substantially annular, and establishes liquid-tight sealing between an inner peripheral surface of case 30 and an outer peripheral surface (i.e., a shaft-side seal surface 412) of shaft 41. Seal SL is fitted to seal retainer 32 such that an outer peripheral surface of seal SL is in close contact with an inner peripheral surface of seal retainer 32, and an inner peripheral surface of seal SL is in close contact with the outer peripheral surface of shaft 41. This suppresses lubricant TF filled inside case 30 from flowing outside.

Output shaft 31 includes an ordinary section 310 and a driving-side spline 311. Ordinary section 310 is shaped cylindrical. Driving-side spline 311 is formed in a predetermined region in a rear end of ordinary section 310 (i.e., an axial region inserted in shaft through hole 410), and is less in outer diameter than ordinary section 310, and is in spline coupling with a driven-side spline 411 of first driving-side joint J11. Thus, driving-side spline 311 and driven-side spline 411 engage with each other in a range in which driving-side spline 311 is formed. This allows output shaft 31 and first driving-side joint J11 to move relatively with respect to each other in the axial direction.

As shown in FIGS. 2 and 3, first driving-side joint J11 connected to output shaft 31 of transmission 3 includes the shaft 41, a yoke body 42, and a pair of yokes 43 and 44. Shaft 41 is connected to output shaft 31 via the spline coupling. Yoke body 42 is formed adjacently to a rear end of shaft 41, and has a shape of a flange increasing in diameter. The pair of yokes 43 and 44 branch off from yoke body 42 into the two, and extend away from shaft 41 in the axial direction. Shaft 41, yoke body 42, and the pair of yokes 43 and 44 are formed integrally by forging. First driving-side joint J11 is greater in torsional strength than a stub shaft 12 (in detail, than a minimum diameter constriction 71 described below).

Shaft 41 has a cylindrical tubular shape, and serves as a vehicle connection tube according to the present invention, and incudes shaft through hole 410 in an inner circumferential side of shaft 41. Shaft through hole 410 extends in the axial direction, and receives output shaft 31 of transmission 3. Shaft through hole 410 includes in its predetermined axial range the driven-side spline 411 structured to be in spline coupling with driving-side spline 311 formed in the outer periphery of output shaft 31 of transmission 3. Shaft 41 includes in its outer periphery the shaft-side seal surface 412 shaped flat and structured to be in close contact with the inner peripheral surface of seal SL interposed between shaft 41 and case 30 of transmission 3. The close contact between shaft-side seal surface 412 and the inner peripheral surface of seal SL suppresses lubricant TF filled inside case 30 of transmission 3 from flowing outside. Shaft through hole 410 is provided with a plug 66 mounted to a rear end of shaft through hole 410 by press-fitting. Plug 66 has a substantially disc shape and serves as a bottom of shaft 41, and thereby establishes sealing for lubricant TF introduced from case 30 of transmission 3 into an interior of shaft through hole 410.

Shaft 41 further includes a shaft peripheral taper 413 in an outer peripheral edge of a tip of shaft 41. Shaft peripheral taper 413 substantially has a shape of a tapered cone gradually decreasing in outer diameter as approaching to a tip of shaft peripheral taper 413. This suppresses the inner peripheral surface of seal SL from being damaged by the tip of shaft 41 upon insertion of shaft 41 into case 30 provided with seal SL, where the tip of shaft 41 slides on the inner peripheral surface of seal SL.

Yoke body 42 has a substantially disc shape increasing stepwise in diameter with respect to shaft 41. Yoke body 42 includes in its bottom (i.e., front end) a stopper 45. Stopper 45 is structured to contact with a rear end face of case 30 of transmission 3 and thereby regulate movement of output shaft 31 of transmission 3 and shaft 41 to approach each other.

Stopper 45 is composed of the bottom of yoke body 42 decreasing in diameter to form a step, and is slightly greater in outer diameter than the rear end of case 30 of transmission 3. Stopper 45 is accompanied by a cover 61 fixed to an outer periphery of stopper 45 by press-fitting. Cover 61 has a cylindrical tubular shape, and extends toward case 30 axially facing stopper 45. Cover 61 overlaps with case 30 in the axial direction, and covers an axial gap created in a state in which case 30 and stopper 45 are apart from each other. This suppresses shaft-side seal surface 412 from undergoing adhesion of a foreign substance.

Each of the pair of yokes 43 and 44 extends in the axial direction from an end edge of an outer periphery of yoke body 42, and is thicker than shaft 41. The pair of yokes 43 and 44 respectively include a pair of shaft through holes 430 and 440. The pair of shaft through holes 430 and 440 radially face each other across rotational axis Z when viewed in a direction of thickness of yokes 43 and 44, and are structured to respectively engage with a pair of shafts J131 and J132 (see FIG. 1) of first cross shaft J13.

First Embodiment (Configurations of Connection between First Shaft and Second Shaft)

Figure 4:
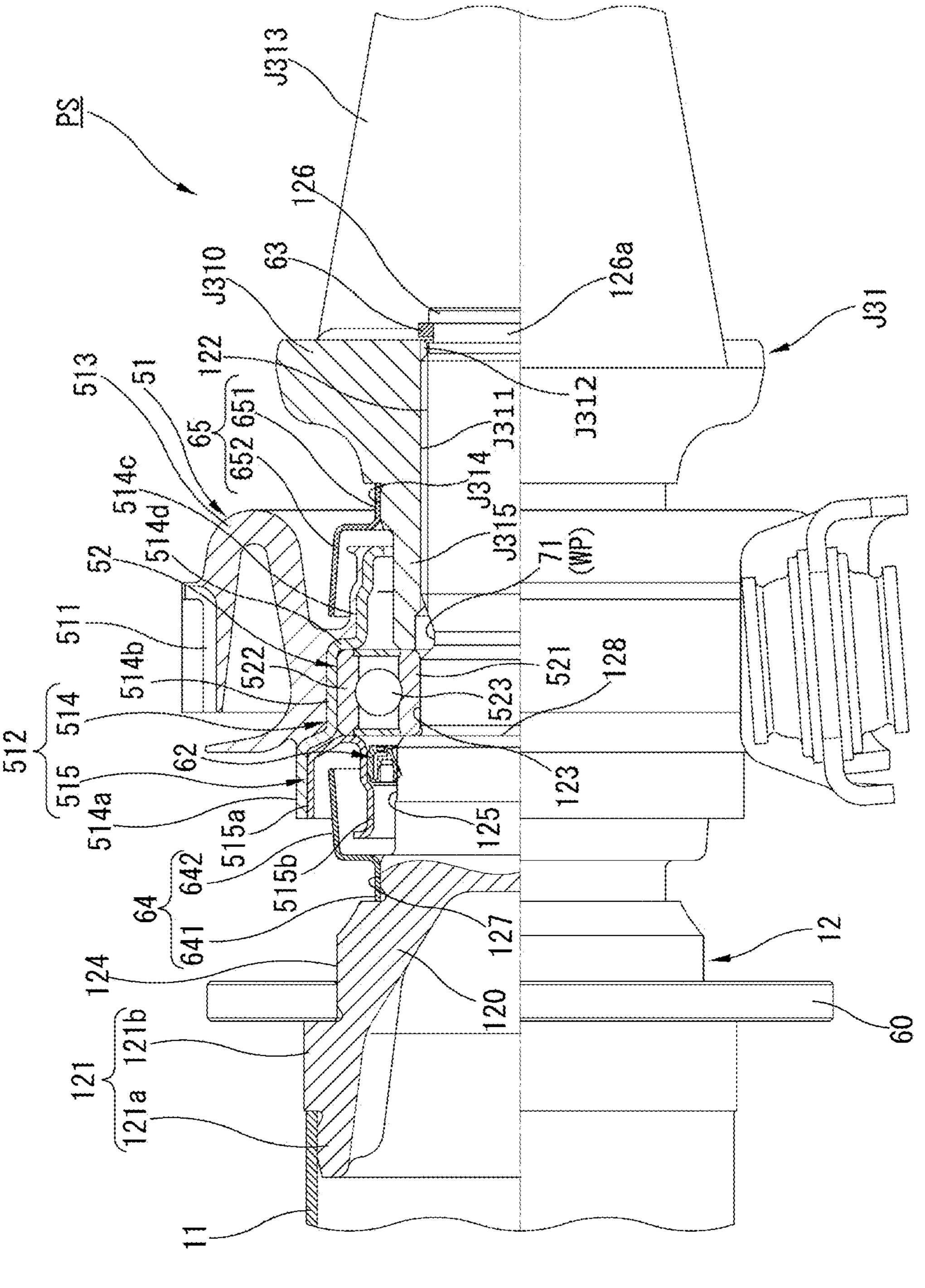
FIG. 4 is an enlarged sectional view of a connection between a first shaft and a second shaft shown in FIG. 1.
Figure 5:
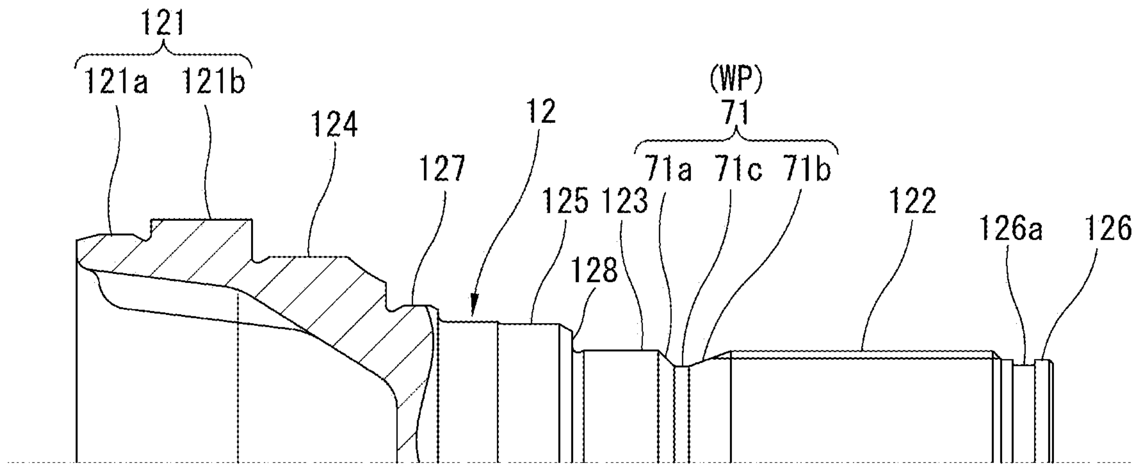
FIG. 5 is an enlarged sectional view of a stub shaft of the propeller shaft according to the first embodiment of the present invention.

FIG. 4 is an enlarged sectional view of a connection between first shaft 1 and second shaft 2 shown in FIG. 1, which enlarges the connection. FIG. 5 is a half sectional view of stub shaft 12 shown in FIG. 4.

As shown in FIG. 4, first shaft 1 includes a tube 11 and the stub shaft 12. Tube 11 is connected to a rear end of first driven-side joint J12. Stub shaft 12 is connected to a rear end of tube 11, and establishes connection with second shaft 2. A first shaft unit according to the present invention includes first shaft 1 and first joint J1, and therefore includes tube 11, stub shaft 12, and the sleeve yoke corresponding to first driving-side joint J11 of first joint J1.

Tube 11 is made of a fiber reinforced plastic (FRP), and has a shape of a cylindrical tube relatively thin. Tube 11 includes a front end fixed to the rear end of first driven-side joint J12 by press-fitting, and includes a rear end fixed to a front end of stub shaft 12 by press-fitting.

As shown in FIGS. 4 and 5, stub shaft 12 includes a connection section 121, an external spline 122, and a bearing fixing section 123. Connection section 121 is connected to tube 11. External spline 122 is formed in a side axially opposite to connection section 121, and is structured to be in spline coupling with an internal spline J311 formed in third driving-side joint J31. Bearing fixing section 123 is disposed between connection section 121 and external spline 122, and is a section to which center bearing 52 is fixed.

Connection section 121 includes a press-fitting section 121*a* and a flange section 121*b*. Press-fitting section 121*a* is press-fitted to an inner peripheral surface of the rear end of tube 11. Flange section 121*b* is adjacent to a rear end of press-fitting section 121*a*, and is shaped to increase in diameter to form a step. Thus, press-fitting section 121*a* is press-fitted to the rear end of tube 11 such that a front end face of flange section 121*b* is pressed onto a rear end face of tube 11.

Stub shaft 12 further includes a collision member mounting section 124 adjacently to a rear end of flange section 121*b*. Collision member mounting section 124 is a section to which a collision member 60 is mounted. Collision member 60 has a disc shape substantially, and is structured to collide with center bearing supporter 51 (in detail, a vehicle mounting portion 511 described below) in case that, for example, first shaft 1 and second shaft 2 move to approach each other due to an event such as a vehicle collision in the front-and-rear direction. Collision member mounting section 124 is formed adjacently to the rear end of flange section 121*b*, in an outer periphery of a stub tubular section 120 being hollow and opening frontward, and is a flat surface shaped to decrease in diameter to form a step with respect to flange section 121*b*. Collision member 60 is fixed to collision member mounting section 124 by press-fitting from the rear end of stub shaft 12 such that a front end face of collision member 60 is pressed onto a rear end face of flange section 121*b*.

Stub shaft 12 further includes a seal mounting section 125 disposed in a rear side with respect to collision member mounting section 124, between collision member mounting section 124 and a bearing fixing section 123. Seal mounting section 125 receives a seal 62 shaped substantially annular and mounted to seal mounting section 125. Seal mounting section 125 is greater in outer diameter than an inner ring 521 of center bearing 52. Seal 62 is fitted to seal mounting section 125, and establishes liquid-tight sealing between seal mounting section 125 and a front end of a bearing supporting portion 512 (in detail, a second supporter 515 described below).

External spline 122 of stub shaft 12 is formed in the rear end of stub shaft 12, and occupies a predetermined axial range. Adjacently to a rear end of external spline 122, stub shaft 12 includes a small diameter end section 126. Small diameter end section 126 is less in diameter than external spline 122, and includes in its outer peripheral surface an annular groove 126*a* to which a known locking ring 63 such as a snap ring is fitted. Locking ring 63 fitted to annular groove 126*a* is locked on a locking projection J312 formed in a rear end of internal spline J311 of third driving-side joint J31. This prevents external spline 122 from escaping from internal spline J311.

Bearing fixing section 123 of stub shaft 12 is formed adjacently to a rear end of seal mounting section 125, and is shaped to decrease in diameter to form a step with respect to seal mounting section 125, and is slightly greater in outer diameter than external spline 122, and is a flat surface having a diameter designed to allow inner ring 521 of center bearing 52 to be press-fitted to bearing fixing section 123. Stub shaft 12 further includes a step 128 between bearing fixing section 123 and seal mounting section 125. Step 128 rises substantially perpendicularly to an outer peripheral surface of bearing fixing section 123. Inner ring 521 of center bearing 52 is pressed onto step 128.

Center bearing supporter 51 includes a vehicle mounting portion 511, the bearing supporting portion 512, and an elastic supporting portion 513. Vehicle mounting portion 511 is made of a metal, and is mounted to the bottom of the floor of the vehicle body not shown. Bearing supporting portion 512 is made of a metal, and supports center bearing 52. Elastic supporting portion 513 is made of a rubber, and connects vehicle mounting portion 511 and bearing supporting portion 512. Bearing supporting portion 512 supports a middle part of propeller shaft PS via center bearing 52, while elastic supporting portion 513 elastically supports bearing supporting portion 512. This allows center bearing supporter 51 to elastically support propeller shaft PS, which moves in the axial direction during vehicle traveling, on the bottom of the floor of the vehicle body not shown.

Bearing supporting portion 512 includes a first supporter 514 and a second supporter 515. First supporter 514 has a shape of a cylindrical tube shaped to decrease in diameter stepwise as going in a front-to-rear direction. Second supporter 515 is mounted to an inner periphery of a front end of first supporter 514, and has a bent shape opening frontward.

First supporter 514 is a cylindrical tube made of a metallic thin plate, and includes a large diameter section 514*a*, a middle diameter section 514*b*, and a small diameter section 514*c*. Large diameter section 514*a* is disposed in the front end of first supporter 514. Middle diameter section 514*b* is shaped to decrease in diameter to form a step with respect to large diameter section 514*a*. Small diameter section 514*c* is shaped to decrease in diameter to form a step with respect to middle diameter section 514*b*. Large diameter section 514*a* includes the inner periphery to which second supporter 515 is fixed. Middle diameter section 514*b* retains an outer peripheral surface of an outer ring 522 of center bearing 52, while a step 514*d* formed adjacently to a rear end of middle diameter section 514*b* regulates rearward movement of outer ring 522 by contacting with a rear end face of outer ring 522. Small diameter section 514*c* extends rearward so as to overlap with the front end of third driving-side joint J31 in the axial direction.

Second supporter 515 is formed by bending a metallic thin plate frontward so as to have a horizontal-U-shaped longitudinal section, and includes a first side portion 515*a* and a second side portion 515*b*. First side portion 515*a* is connected to first supporter 514 (in detail, large diameter section 514*a*) via the above bent portion. Second side portion 515*b* faces seal mounting section 125, and retains seal 62.

Center bearing 52 is a known ball bearing, and includes inner ring 521, outer ring 522, and balls 523. Inner ring 521 is fixed to bearing fixing section 123 by press-fitting. Outer ring 522 is supported by center bearing supporter 51. Balls 523 are rolling bodies supported between inner ring 521 and outer ring 522 so as to be rollable therebetween. Inner ring 521 includes a front end being in contact with a rear end face of seal mounting section 125 and a rear end being in contact with the front end of third driving-side joint J31, and thereby is sandwichedly retained between the rear end face of seal mounting section 125 and the front end of third driving-side joint J31. Outer ring 522 includes the outer periphery retained by middle diameter section 514*b* of bearing supporting portion 512, and is sandwichedly retained between step 514*d* and second supporter 515 of bearing supporting portion 512.

Stub shaft 12 further includes a cover mounting section 127 between collision member mounting section 124 and seal mounting section 125 in the axial direction. Cover mounting section 127 is substantially flat, and receives a first dust cover 64 mounted to cover mounting section 127. First dust cover 64 has a shape of a substantially cylindrical tube extending rearward, and includes a first cover small diameter section 641 and a first cover large diameter section 642 that are made of a metal and formed integrally with each other. First cover small diameter section 641 is fixed to cover mounting section 127 by press-fitting. First cover large diameter section 642 is disposed oppositely to first cover small diameter section 641 in the axial direction, and is shaped to increase in diameter to form a step as going rearward from first cover small diameter section 641. Furthermore, first cover large diameter section 642 is inserted between first side portion 515*a* and second side portion 515*b* of second supporter 515 of center bearing supporter 51, and overlaps with first side portion 515*a* and second side portion 515*b* in the axial direction. This configuration of inserting first cover large diameter section 642 in an frontward opening of second supporter 515 in order to overlap with first side portion 515*a* and second side portion 515*b* of second supporter 515 forms a so-called labyrinth structure composed of first dust cover 64 and second supporter 515.

Stub shaft 12 further includes a minimum diameter constriction 71 between external spline 122 and bearing fixing section 123 in the axial direction. Minimum diameter constriction 71 is less in outer diameter than a remaining part of the outer periphery of stub shaft 12. Minimum diameter constriction 71 is a constriction formed between external spline 122 and bearing fixing section 123, and has an outer diameter less than a diameter of a root of external spline 122, and serves as a weakest part WP less in torsional strength than a remaining part of first shaft 1. In detail, minimum diameter constriction 71 includes a first tapered section 71*a*, a second tapered section 71*b*, and a minimum diameter section 71*c*. First tapered section 71*a* gradually decreases in outer diameter in a direction from bearing fixing section 123 toward external spline 122. Second tapered section 71*b* gradually decreases in outer diameter in a direction from external spline 122 toward bearing fixing section 123. Minimum diameter section 71*c* is flat, and is disposed between first tapered section 71*a* and second tapered section 71*b*, and has a diameter that is the smallest in the outer periphery of stub shaft 12.

Third driving-side joint J31 includes a shaft connecting section J310 and the internal spline J311. Shaft connecting section J310 has a substantially cylindrical tubular shape, and is connected to stub shaft 12. Internal spline J311 is structured to be in spline coupling with external spline 122 of stub shaft 12, and is formed in an inner periphery of shaft connecting section J310 so as to occupy a predetermined axial range. Furthermore, third driving-side joint J31 includes the locking projection J312 in the inner periphery of the rear end of internal spline J311, wherein locking ring 63 is locked on locking projection J312.

Shaft connecting section J310 includes an outer periphery shaped to decrease in diameter stepwise as going frontward. The outer periphery of shaft connecting section J310 includes a pair of third driving-side joint yokes J313, a third driving-side joint cover mounting section J314, and a third driving-side joint small diameter section J315. The pair of third driving-side joint yokes J313 are disposed in a rear end of shaft connecting section J310. Third driving-side joint cover mounting section J314 is shaped to decrease in diameter to form a step with respect to third driving-side joint yokes J313. Third driving-side joint small diameter section J315 is shaped to decrease in diameter to form a step with respect to third driving-side joint cover mounting section J314. The pair of third driving-side joint yokes J313 are connected to third cross shaft J33. Third driving-side joint small diameter section J315 is inserted in the rear end of first supporter 514 of center bearing supporter 51 so as to be in contact with the rear end of inner ring 521 of center bearing 52.

Third driving-side joint cover mounting section J314 receives a second dust cover 65 mounted thereto. Second dust cover 65 has a substantially cylindrical tubular shape extending frontward, and includes a second cover small diameter section 651 and a second cover large diameter section 652 that are made of a metal and formed integrally with each other. Second cover small diameter section 651 is fixed to third driving-side joint cover mounting section J314 by press-fitting. Second cover large diameter section 652 is disposed oppositely to second cover small diameter section 651 in the axial direction, and is shaped to increase in diameter to form a step as going frontward from second cover small diameter section 651. Second cover large diameter section 652 surrounds small diameter section 514*c* of center bearing supporter 51, and overlaps with an outer periphery of small diameter section 514*c* in the axial direction. This overlapping between second cover large diameter section 652 of second dust cover 65 and small diameter section 514*c* of center bearing supporter 51 forms a so-called labyrinth structured composed of second dust cover 65 and first supporter 514.

Effects of First Embodiment

The conventional propeller shaft described above fails to consider a relation between strength of the sleeve yoke and strength of the stub shaft. This may cause the sleeve yoke to be lower than the stub shaft in torsional strength, and be a weakest part in the first shaft including the first joint. If the sleeve yoke is broken, it may cause a leak of lubricant filled inside the transmission connected to the sleeve yoke. This is a room for improvement.

On the other hand, propeller shaft PS according to the present embodiment exhibits the following effects, and thereby serves to solve the technical problem of the conventional propeller shaft above.

Propeller shaft PS according to the present embodiment is the propeller shaft for transmitting driving force of the vehicle (not shown), and includes vehicle mounting member 5 and the first shaft unit. Vehicle mounting member 5 serves for mounting to the vehicle, and includes the mounting part (i.e., center bearing supporter 51) structured to be mounted to the vehicle and the supported part (i.e., center bearing 52) supported by center bearing supporter 51. The first shaft unit is supported by the vehicle via vehicle mounting member 5, and includes the sleeve yoke (i.e., first driving-side joint J11), stub shaft 12, and tube 11. First driving-side joint J11 is structured to be connected to output shaft 31 of transmission 3 of the vehicle, and receive driving force of the vehicle via output shaft 31. Stub shaft 12 is disposed oppositely to first driving-side joint J11 in the direction of rotational axis Z of the first shaft unit, and is covered by center bearing 52 of vehicle mounting member 5. Tube 11 connects first driving-side joint J11 and stub shaft 12. Stub shaft 12 includes weakest part WP (i.e., minimum diameter constriction 71 in the present embodiment) structured to be less in torsional strength than the remaining part of the first shaft unit and formed at a position at which stub shaft 12 overlaps with vehicle mounting member 5 in the direction of rotational axis Z.

Thus, according to the present embodiment, stub shaft 12 of the first shaft unit includes minimum diameter constriction 71 at the position at which stub shaft 12 overlaps with vehicle mounting member 5. Minimum diameter constriction 71 serves as weakest part WP at which the first shaft unit including first joint J1 is least in torsional strength. This suppresses leaking of lubricant TF filled inside case 30 of transmission 3 receiving first driving-side joint J11, in case that first driving-side joint J11 is damaged due to an event such as a vehicle collision.

Furthermore, according to the present embodiment, the mounting part is center bearing supporter 51, and the supported part is center bearing 52 supporting stub shaft 12 such that stub shaft 12 is rotatable.

Thus, according to the present embodiment, the first shaft unit is supported by the vehicle via center bearing 52 fixed to bearing fixing section 123 and center bearing supporter 51 supporting center bearing 52. This causes the first shaft unit to be supported by the vehicle via center bearing 52 and center bearing supporter 51 even in case that minimum diameter constriction 71 being weakest part WP is damaged due to an event such as a vehicle collision. This suppresses dropping of the first shaft from the vehicle body due to damage on minimum diameter constriction 71.

Still further, according to the present embodiment, stub shaft 12 includes connection section 121, external spline 122, and bearing fixing section 123. Connection section 121 is connected to tube 11. External spline 122 is formed in the outer peripheral surface of stub shaft 12, oppositely to connection section 121 in the direction of rotational axis Z. Bearing fixing section 123 is disposed between connection section 121 and external spline 122, wherein center bearing 52 is fixed to bearing fixing section 123. Weakest part WP is formed between external spline 122 and bearing fixing section 123 in the direction of rotational axis Z.

Thus, according to the present embodiment, bearing fixing section 123 of stub shaft 12 is supported by the vehicle body via center bearing 52 and center bearing supporter 51. This causes a part of the first shaft unit, i.e. a side including bearing fixing section 123 with respect to minimum diameter constriction 71, to be supported by the vehicle body via center bearing 52 and center bearing supporter 51 even in case the first shaft unit is divided due to damage on minimum diameter constriction 71 being weakest part WP. This suppresses dropping of the part of the side including bearing fixing section 123 (i.e., a front side) with respect to minimum diameter constriction 71 from the vehicle body due to damage on minimum diameter constriction 71.

In addition, according to the present embodiment, minimum diameter constriction 71 is formed between bearing fixing section 123 and external spline 122 in the axial direction. This allows minimum diameter constriction 71 to be formed without affecting the press-fitting of center bearing 52 to bearing fixing section 123.

Still further, according to the present embodiment, propeller shaft PS includes a second shaft unit (including second shaft 2 and third joint J3) that includes internal spline J311 engaging with the external spline 122, and is connected to the first shaft unit via internal spline J311. The second shaft unit further includes the cover (i.e., second dust cover 65) shaped tubular and disposed around internal spline J311 so as to surround the inner peripheral part (i.e., first supporter 514) of center bearing supporter 51 in the direction of rotational axis Z.

Thus, according to the present embodiment, second dust cover 65 disposed in the outer periphery of the second shaft unit overlaps with center bearing supporter 51 in the direction of rotational axis Z. In detail, second cover large diameter section 652 of second dust cover 65 surrounds the outer periphery of small diameter section 514*c* of first supporter 514 of center bearing supporter 51. This causes the vehicle to support the second shaft unit, which is positioned in the rear side with respect to minimum diameter constriction 71, by catching second cover large diameter section 652 of second dust cover 65 with small diameter section 514*c* of first supporter 514 even in case that minimum diameter constriction 71 being weakest part WP of the first shaft unit is damaged to divide the first shaft unit and the second shaft unit due to an event such as a vehicle collision.

Still further, according to the present embodiment, minimum diameter constriction 71 serving as weakest part WP is formed in the outer peripheral surface of stub shaft 12, and is the constriction less than the root of external spline 122 in diameter in the radial direction with respect to rotational axis Z.

Thus, according to the present embodiment, minimum diameter constriction 71 is the constriction less than the root of external spline 122 in diameter. Minimum diameter constriction 71 less than the root of external spline 122 in diameter is formed adjacently to the root of external spline 122 having a relatively small diameter. This serves to reduce an amount of machining to form minimum diameter constriction 71, and thereby facilitate production of minimum diameter constriction 71 and improve minimum diameter constriction 71 in production yield.

Still further, according to the present embodiment, stub shaft 12 includes the outer peripheral surface that is least in diameter at weakest part WP, in the direction of rotational axis Z.

Thus, according to the present embodiment, minimum diameter constriction 71 serving as weakest part WP is a part having the minimum diameter out of the outer peripheral surface of stub shaft 12. This facilitates forming of minimum diameter constriction 71.

Still further, according to the present embodiment, first driving-side joint J11 includes the vehicle connection tube (i.e., shaft through hole 410 of shaft 41) and the bottom (i.e., plug 66). Shaft through hole 410 is connected to the vehicle, and receives lubricant introduced from the vehicle. Plug 66 is disposed oppositely to the side connected to the vehicle, and seals shaft through hole 410. First driving-side joint J11 is greater in torsional strength than weakest part WP.

Thus, according to the present embodiment, first driving-side joint J11 is greater in torsional strength than weakest part WP, and has no risk of becoming weakest part WP. This suppresses lubricant TF filled inside first driving-side joint J11 from leaking out due to damage on minimum diameter constriction 71 being weakest part WP.

(Variation)

Figure 6:
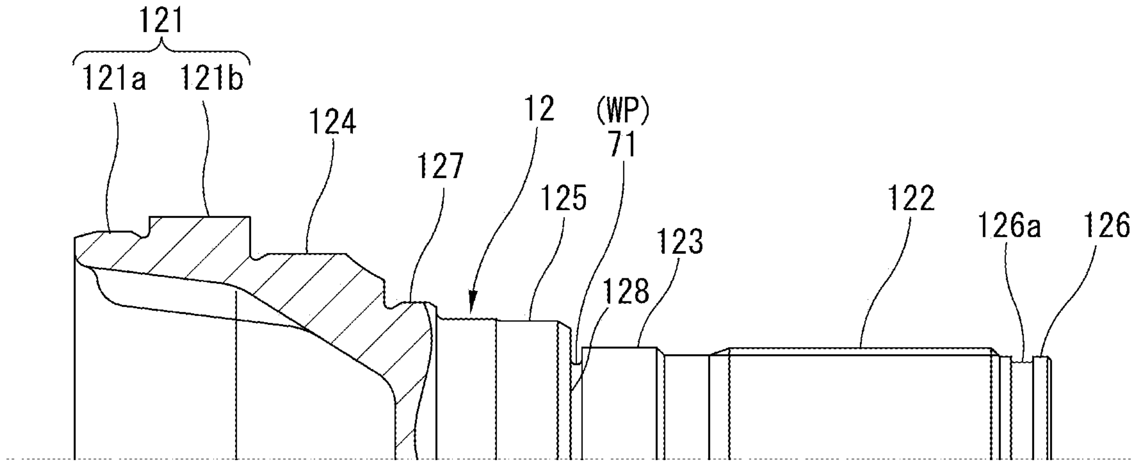
FIG. 6 is an enlarged sectional view of a stub shaft of a propeller shaft according to a variation of the first embodiment of the present invention.

FIG. 6 shows a propeller shaft according to a variation of the first embodiment of the present invention, in which the position of minimum diameter constriction 71 is changed from the first embodiment. Except this change, the other basic configurations in the variation are same with the first embodiment. Thus, the configurations same with the first embodiment are represented by the same reference numerals, and explanations thereof are omitted.

FIG. 6 is a half sectional view of stub shaft 12 of first shaft 1 according to the variation of the first embodiment of the present invention.

As shown in FIG. 6, propeller shaft PS according to the present variation includes minimum diameter constriction 71 in step 128 of stub shaft 12 of first shaft 1. In other words, propeller shaft PS according to the present variation is configured such that a boundary section formed between bearing fixing section 123 and step 128 adjacently to a front end of bearing fixing section 123 is the smallest in outer diameter out of stub shaft 12. Thus, minimum diameter constriction 71 in step 128 is weakest part WP that is the smallest in torsional strength out of the first shaft unit including first joint J1.

As described above, according to the present variation, stub shaft 12 includes connection section 121, external spline 122, bearing fixing section 123, and step 128. Connection section 121 is connected to the tube 11. External spline 122 is formed in the outer peripheral surface of stub shaft 12, oppositely to connection section 121 in the direction of rotational axis Z. Bearing fixing section 123 is disposed between connection section 121 and external spline 122, wherein center bearing 52 is fixed to bearing fixing section 123. Step 128 is disposed between connection section 121 and bearing fixing section 123, and is greater in diameter than inner ring 521 of center bearing 52, wherein inner ring 521 of center bearing 52 is pressed onto step 128. Weakest part WP is formed in step 128.

Thus, according to the present variation, minimum diameter constriction 71 serving as weakest part WP is formed in step 128 onto which inner ring 521 of center bearing 52 is pressed. This allows minimum diameter constriction 71 and step 128 to be machined at once during machining of stub shaft 12, and thereby improves propeller shaft PS in productivity.

Second Embodiment

Figure 7:
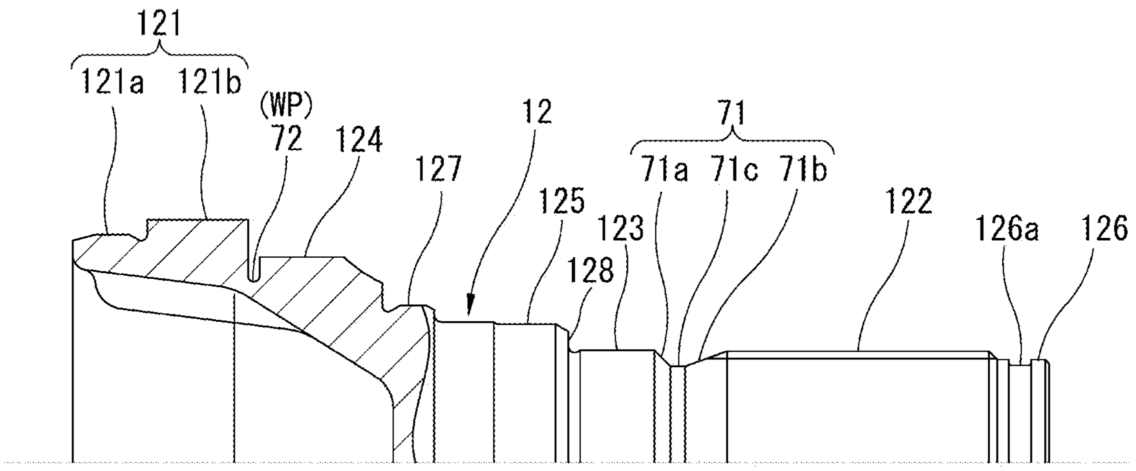
FIG. 7 is an enlarged sectional view of a stub shaft of a propeller shaft according to a second embodiment of the present invention.

FIG. 7 shows a propeller shaft according to a second embodiment of the present invention, in which the configurations of weakest part WP are changed from the first embodiment. Except this change, the other basic configurations in the second embodiment are same with the first embodiment. Thus, the configurations same with the first embodiment are represented by the same reference numerals, and explanations thereof are omitted.

FIG. 7 is a half sectional view of stub shaft 12 of first shaft unit 1 according to the second embodiment of the present invention.

As shown in FIG. 7, propeller shaft PS according to the second embodiment includes weakest part WP adjacently to collision member mounting section 124 that is a part of stub tubular section 120 of stub shaft 12 of first shaft unit 1. Specifically, propeller shaft PS includes a constriction 72 in a boundary section between collision member mounting section 124 and connection section 121, adjacently to a front end of collision member mounting section 124. Constriction 72 is relatively deeply depressed inward in the radial direction. This configuration of constriction 72 relatively deeply depressed inward in the radial direction reduces a thickness of stub tubular section 120 locally, and thereby forms a thin part serving as weakest part WP that is the smallest in torsional strength out of the first shaft unit including first joint J1.

As described above, according to the present embodiment, stub shaft 12 includes connection section 121, external spline 122, bearing fixing section 123, step 128, and stub tubular section 120. Connection section 121 is connected to the tube 11. External spline 122 is formed in the outer peripheral surface of stub shaft 12, oppositely to connection section 121 in the direction of rotational axis Z. Bearing fixing section 123 is disposed between connection section 121 and external spline 122, wherein center bearing 52 is fixed to bearing fixing section 123. Step 128 is disposed between connection section 121 and bearing fixing section 123, and is greater in diameter than inner ring 521 of center bearing 52, wherein inner ring 521 of center bearing 52 is pressed onto step 128. Stub tubular section 120 is disposed between connection section 121 and step 128. Weakest part WP is formed in stub tubular section 120.

Thus, according to the present embodiment, stub tubular part 120 is formed between connection section 121 and step 128. Stub tubular part 120 is shaped hollow, and thereby serves to lighten stub shaft 12 and reduce the thickness of constriction 72 serving as weakest part WP. This allows constriction 72 to form weakest part WP more effectively.

Third Embodiment

Figure 8:
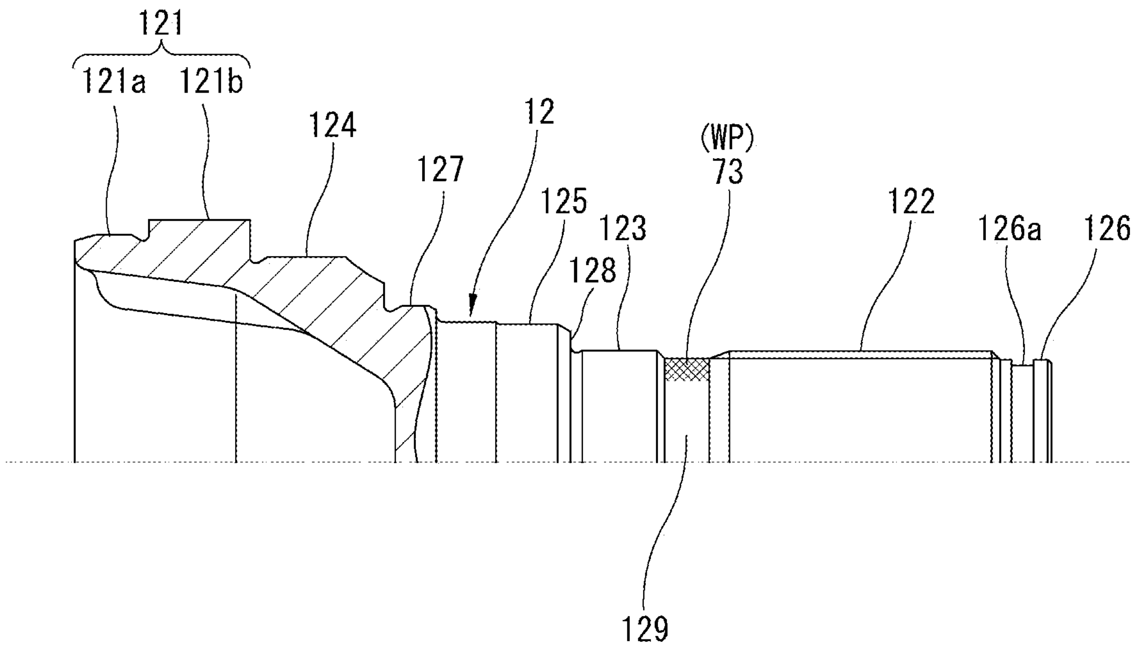
FIG. 8 is an enlarged sectional view of a stub shaft of a propeller shaft according to a third embodiment of the present invention.

FIG. 8 shows a propeller shaft according to a third embodiment of the present invention, in which the configurations of weakest part WP are changed from the first embodiment. Except this change, the other basic configurations in the third embodiment are same with the first embodiment. Thus, the configurations same with the first embodiment are represented by the same reference numerals, and explanations thereof are omitted.

FIG. 8 is a half sectional view of stub shaft 12 of first shaft 1 according to the third embodiment of the present invention.

As shown in FIG. 8, propeller shaft PS according to the third embodiment includes an annealed section 73 between external spline 122 and bearing fixing section 123 in stub shaft 12 of first shaft 1. Annealed section 73 has been processed by annealing, and is formed in a flat section 129 that is, in outer diameter, substantially equal to the root of external spline 122 and greater than annular groove 126*a*. In the third embodiment, annealed section 73 serves as weakest part WP that is the smallest in torsional strength out of the first shaft unit including first joint J1.

As described above, according to the present embodiment, weakest part WP is formed by annealing.

Thus, according to the present embodiment, weakest part WP is annealed section 73. This eliminates necessity for forming weakest part WP as a groove like minimum diameter constriction 71 or constriction 72. In case of weakest part WP as a groove, the forming of weakest part WP requires securing of not only a groove depth but also a groove width depending on a shape of a tool used for machining of weakest part WP. On the other hand, in case of the annealing, the forming weakest part WP requires only indication of a region to be heat-treated. This allows stub shaft 12 to be shaped more freely.

In case of weakest part WP shaped as a groove, the groove cannot accept press-fitting of a component thereto, and requires securing of a space for the groove. This may restrict a layout of weakest part WP. On the other hand, in case of the annealing, weakest part WP may be shaped flat and designed to accept press-fitting of a component thereto.

Moreover, in case of forming weakest part WP by annealing, external spline 122 may be increased in length in comparison with the case of forming weakest part WP as a groove. This reduces a load per unit area exerted on teeth of external spline 122, and thereby improves external spline 122 in strength.

The present invention is not limited to the configurations and the modes exemplified in the above embodiments etc., but may be freely modified depending on specifications, costs, etc. of an application target, as long as exhibiting the effects of the present invention described above.

The invention claimed is:

1. A propeller shaft for transmitting driving force of a vehicle, the propeller shaft comprising:

a vehicle mounting member that serves for mounting to the vehicle, and includes a mounting part structured to be mounted to the vehicle and a supported part supported by the mounting part; and a first shaft unit that is supported by the vehicle via the vehicle mounting member, and includes a sleeve yoke, a stub shaft, and a tube, wherein:

the sleeve yoke is structured to be connected to an output shaft of a transmission of the vehicle, and receive driving force of the vehicle via the output shaft;

the stub shaft is disposed oppositely to the sleeve yoke in a direction of a rotational axis of the first shaft unit, and is covered by the supported part of the vehicle mounting member;

the tube connects the sleeve yoke and the stub shaft;

the stub shaft includes a weakest part structured to be less in torsional strength than a remaining part of the first shaft unit and formed at a position at which the stub shaft overlaps with the vehicle mounting member in the direction of the rotational axis;

the mounting part is a center bearing supporter; and the supported part is a bearing supporting the stub shaft such that the stub shaft is rotatable.

2. The propeller shaft as claimed in claim 1, wherein:

the stub shaft includes a connection section, an external spline, and a bearing fixing section;

the connection section is connected to the tube;

the external spline is formed in an outer peripheral surface of the stub shaft, oppositely to the connection section in the direction of the rotational axis;

the bearing fixing section is disposed between the connection section and the external spline, wherein the bearing is fixed to the bearing fixing section; and the weakest part is formed between the external spline and the bearing fixing section in the direction of the rotational axis.

3. The propeller shaft as claimed in claim 2, further comprising:

a second shaft unit that includes an internal spline engaging with the external spline, and is connected to the first shaft unit via the internal spline, wherein the second shaft unit further includes a cover shaped tubular and disposed around the internal spline so as to surround an inner peripheral part of the center bearing supporter in the direction of the rotational axis.

4. The propeller shaft as claimed in claim 2, wherein the weakest part is formed in an outer peripheral surface of the stub shaft, and is a constriction less than a root of the external spline in diameter in a radial direction with respect to the rotational axis.

5. The propeller shaft as claimed in claim 1, wherein the stub shaft includes an outer peripheral surface that is least in diameter at the weakest part, in the direction of the rotational axis.

6. The propeller shaft as claimed in claim 1, wherein:

the stub shaft includes a connection section, an external spline, a bearing fixing section, and a step;

the connection section is connected to the tube;

the external spline is formed in an outer peripheral surface of the stub shaft, oppositely to the connection section in the direction of the rotational axis;

the bearing fixing section is disposed between the connection section and the external spline, wherein the bearing is fixed to the bearing fixing section;

the step is disposed between the connection section and the bearing fixing section, and is greater in diameter than an inner ring of the bearing, wherein the inner ring of the bearing is pressed onto the step; and the weakest part is formed in the step.

7. The propeller shaft as claimed in claim 1, wherein:

the stub shaft includes a connection section, an external spline, a bearing fixing section, a step, and a stub tubular section;

the connection section is connected to the tube;

the external spline is formed in an outer peripheral surface of the stub shaft, oppositely to the connection section in the direction of the rotational axis;

the bearing fixing section is disposed between the connection section and the external spline, wherein the bearing is fixed to the bearing fixing section;

the step is disposed between the connection section and the bearing fixing section, and is greater in diameter than an inner ring of the bearing, wherein the inner ring of the bearing is pressed onto the step;

the stub tubular section is disposed between the connection section and the step; and the weakest part is formed in the stub tubular section.

8. The propeller shaft as claimed in claim 1, wherein the weakest part is formed by annealing.

9. The propeller shaft as claimed in claim 1, wherein:

the sleeve yoke includes a vehicle connection tube and a bottom;

the vehicle connection tube is connected to the vehicle, and receives lubricant introduced from the vehicle;

the bottom is disposed oppositely to a side connected to the vehicle, and seals the vehicle connection tube; and the sleeve yoke is greater in torsional strength than the weakest part.

10. A propeller shaft for transmitting driving force of a vehicle, the propeller shaft comprising:

a vehicle mounting member that serves for mounting to the vehicle, and includes a mounting part structured to be mounted to the vehicle and a supported part supported by the mounting part; and a first shaft unit that is supported by the vehicle via the vehicle mounting member, and includes a sleeve yoke, a stub shaft, and a tube, wherein:

the sleeve yoke is structured to be connected to an output shaft of a transmission of the vehicle, and receive driving force of the vehicle via the output shaft;

the stub shaft is disposed oppositely to the sleeve yoke in a direction of a rotational axis of the first shaft unit, and is covered by the supported part of the vehicle mounting member;

the tube connects the sleeve yoke and the stub shaft;

the stub shaft includes a weakest part structured to be less in torsional strength than a remaining part of the first shaft unit and formed at a position at which the stub shaft overlaps with the vehicle mounting member in the direction of the rotational axis;

the sleeve yoke includes a vehicle connection tube and a bottom;

the vehicle connection tube is connected to the vehicle, and receives lubricant introduced from the vehicle;

the bottom is disposed oppositely to a side connected to the vehicle, and seals the vehicle connection tube; and the sleeve yoke is greater in torsional strength than the weakest part.

* * * * *